United States Patent [19]

Stuhlmann

[11] Patent Number: 4,541,283

[45] Date of Patent: Sep. 17, 1985

[54] PRESSURE SENSOR

[75] Inventor: Wolfgang Stuhlmann, Wuppertal, Fed. Rep. of Germany

[73] Assignee: Westinghouse FANAL-Schaltgeraete GmbH, Fed. Rep. of Germany

[21] Appl. No.: 632,318

[22] Filed: Jul. 19, 1984

[30] Foreign Application Priority Data

Feb. 25, 1984 [DE] Fed. Rep. of Germany ....... 3406942

[51] Int. Cl.[4] .............................................. G01L 9/12
[52] U.S. Cl. ........................................ 73/724; 73/718; 361/283
[58] Field of Search ................. 73/724, 718, 711, 386, 73/387; 361/283

[56] References Cited

U.S. PATENT DOCUMENTS 3,408,651 10/1968 Boudouris .............................. 73/386
3,878,725 4/1975 Gaertner ................................ 73/718

Primary Examiner—Donald O. Woodiel
Attorney, Agent, or Firm—Antonelli, Terry & Wands

[57] ABSTRACT

A pressure sensor for monitoring a pressure of an agressive media in a pressure range of about 0.8 to 50 bar, especially for monitoring refrigeration plants, air conditioning plants, or heat pumps, with the sensor including at least one pressure transducer and a mechanical-electric transducer connected to the pressure transducer with the mechanical-electric transformer being in the form of a plate condenser. The pressure transducer and the mechanical-electric transducer are disposed laterally adjacent each other and connected together by a relatively long transmission lever which is mounted at only one end thereof whereby it is possible, in a relatively small space, to realize a large transmission ratio thereby enabling the tying together of the pressure to be determined with a changeable capacity of the plate condenser so that a very steep characteristic line and thus a very high precision of response.

14 Claims, 5 Drawing Figures

PRESSURE SENSOR

The present invention relates to a sensor arrangement and, more particularly, to a pressure sensor for an agressive or corrosive media which is maintained in a pressure range between about 0.8 to 50 bar in, for example, refrigeration plants, air conditioning plants, or heat pumps, with the pressure sensor including a pressure deflection transforming or transducer member and a mechanical electric converter or transducer.

In, for example, heat pumps or air conditioning plants, the pressure of a cooling agent in various parts of the refrigeration systems is monitored and regulated by pressure-dependent switches which are equipped with electric contact systems for turning on and off switching devices such as, for example, overload relays or valves. In older installations, the control voltage was the main supply voltage; however, in recent installations electric switching circuits of lower voltages are used which fulfill higher requirements with regard to precision, safety, programmability, etc.

In, for example, Offenlegungsschrift 32 01 262, a pressure sensor with a pressure path converting or transducer member and a mechanical-electrical converter or transducer member is proposed wherein the mechanical-electrical transducer includes a plate condenser having a movable condenser plate whereby a pressure sensor control is obtained which has a sufficient contact safety for carrying out an electric control even with small voltages and currents. In this proposed construction, the pressure transducer member and the mechanical electric transducer member are interconnected by a transfer or transmission rod so as to provide for a spatial separation between a pressure receiver and a pressure evaluation means. By virtue of this arrangement, an input side of the pressure transducer member may be dimensioned and fashioned of material exclusively taking into account a corrosion resistance of the aggressive or corrosive pressure medium to which it is to be exposed, which medium may, for example, be a cooling agent which, in refrigeration plants, heat pumps, or air conditioning plants, is of considerable significance for an operational safety and total useful life span of the sensor. In this proposed pressure sensor, the response precision is not satisfactory since various joint and connection points necessarily require a certain tolerance or clearance and the space conditions in an area of the joints or connection points are limited. Moreover, the constructional elements which proportionately divide and/or distribute the pressure and response can only be precisely produced with considerable difficulty.

The aim underlying the present invention essentially resides in providing a pressure sensor with low input and output voltages for monitoring a pressure of an aggressive corrosive media, which provide for a precise response and which is relatively simply to manufacture and install.

In accordance with advantageous features of the present invention, a pressure sensor is provided which includes a pressure converter or transducer having a displaceable deflection member and a mechanical-electric converter or transducer in the form of a plate condenser arrangement provided with a movable condenser plate fashioned as a bent plate clamped or fixed at one end thereof. The movable condenser plate includes a power introducing point lying at a predetermined distance from the clamp edge thereof, with the plate condenser arrangement being disposed laterally adjacent the pressure transducer, and with the movable condenser plate extending substantially perpendicular with respect to a direction of movement of the deflection member. A single arm transmission lever, supported at one end, is interposed between the pressure transducer and the mechanical-electric transducer, with a leaf spring means being provided for enabling an adjustment of the pressure control range within a pressure range of between about 0.8 to 50 bar. The leaf spring means is disposed on a side of the transmission lever facing away from the pressure transducer and is adapted to hold the transmission lever against the deflection member and the power introduction point of the movable condenser plate. The leaf spring means is clamped down near a bearing end of the transmission lever and is adapted to load the transmission lever at a point lying directly opposite the deflection member. The transmission lever includes an adjustable leg extending over the plate condenser arrangement.

By virtue of the provision of a single armed transmission lever mounted at one end between the pressure transducer and the mechanical electric transducer, a predetermined large transmission ratio is obtained between the two transducers even in a relatively small space so that the relationship of the pressure to be sensed with the variable capacity of the plate condenser arrangement exhibits a very steep characteristic line thereby resulting in a highly precise response for the pressure sensor.

By forming the movable condenser plate as a bent plate and securely planting or fixing one edge thereof, a clearly defined deformation path free of clearance is provided when ever it is charged at the power introduction point. Since the movable condenser plate is held fast at its clamped edge, a joint connection between the power introduction point and the transmission lever is unnecessary so that it is possible to introduce a desired movement component exclusively perpendicular with respect to the plane of the condenser plate.

By virtue of the features of the present invention, the deflection member of the pressure transducer and power introduction point of the movable condenser plate are capable of excuting movements in parallel to one another so that it will not be necessary to provide for any deflection of the direction between the two points thereby avoiding the possiblity of transmission error between the transducers. Moreover, the leaf spring means, providing for a definite preloading of the transmission lever, is disposed approximately in parallel to the transmission lever so as to enable the realization of a relatively long installation space, that is, the leaf spring means may be large and powerful and may be fashioned with great precision. Because of the relatively large length of the adjustable free leg of the leaf spring member, an area of response may be highly sensitive and precisely adjusted. With an arrangement in accordance with the present invention, the main loads are always absorbed by the leaf spring means so that the transmission lever itself, even in the case of high pressure areas, will hardly be deformed and, consequently, any imprecise sensing will be avoided.

In accordance with the present invention, the condenser plate may be loaded by an additional spring means which counteracts the leaf spring means, and the movable condenser plate may be disposed between two fixed condenser plates. By virtue of the provision of the additional spring means, the deformability of the movable condenser plate may be utilized in both directions so that the pressure response range doubles as compared to an arrangement without the provision of the additional spring means. In this manner, the pressure sensor may be used especially as a three-point switch without substantially increasing the cost for the evaluation circuit.

According to the present invention, it is possible for the pressure sensor to be disposed in a rectangular elongated housing with the leaf spring occupying nearly the full length of the housing and about half a width thereof. In this case, the entire length of the housing is used by the leaf spring, the length of which is predetermined by the parallel arrangement of the pressure transducer and the mechanical-electric transducer. Therefore, the leaf spring means may be made with great precision and permit a precise determination of the actual working ranges required such as, for example, of about 0.5 bar, within the overall pressure range of, for example 0.8 to 50 bar. As a result of the limits of the dimension of the leaf spring to half of a width of the housing, despite the extent substantially over the full length of the housing, sufficient space remains for the additional constructional elements such as, for example, the electronic evaluation circuit.

Advantageously, the leaf spring means may extend from its clamped end to the deflection member approximately in parallel to the transmission lever and subsequently may pass over into the adjustable leg portion thereof. The adjustable leg portion is angled upwardly so as to have a free end thereof attached to an adjusting arrangement connected to a lid of the housing. As a result of the upward inclination or angling of the adjustable leg, a clear spatial separation of the plate condenser and adjusting arrangement results so that the simple clearly defined construction of the plate condenser may be preserved. At the same time, the adjusting arrangement for adjusting the desired response range is easily accessible from above the housing.

Moreover, in accordance with further features of the present invention, the movable condenser plate, at its power introduction point, may carry a tappet on which the transmission lever rests with a sliding member. The tappet clearly defines the power introduction point of the movable condenser plate. Since the transmission lever rests with a sliding member on the tappet, no joint connection exists and, only movements perpendicular to the plane of the condenser plate are transmitted. Transverse components which, to a minor extent, may occur as a result of the rotation of the transmission lever around the support point and possibly as a result of changes in temperature do not enter into the evaluation by the sensor.

In accordance with still further features of the present invention, the pressure sensor may include two pressure transducers provided with separate pressure inlets with the deflection members of the respective transducers being disposed so as to face one another. The two pressure transducers are coupled by way of a coupling bar or rod at the respective deflection members, with the leaf spring means and the transmission lever each being provided with passage means for accommodating the coupling bar or rod. The pressure sensor of this type construction is suitable for mointoring pressure differences.

It is also possible in accordance with the present invention, for the pressure sensor to include two pressure transducers with a common pressure inlet, with the deflecting members of the pressure transducers being coupled to one another at outlet sides thereof by a coupling bar or rod. The pressure transducers are of a variable size and pressure chambers thereof are interconnected by a channel arranged in the coupling bar or rod. A pressure sensor of this type is suitable for monitoring higher pressures.

In accordance with the present invention, the pressure sensors may include membranes or diaphragms, diaphragm boxes, a corrugated or bellows type pipe, Bourdon tubes, or cylinder/piston arrangements, with all of these elements being easily integrated into one arrangement by virtue of the features of the present invention.

In accordance with a further development of the present invention, the pressure sensor may include an electric evaluation circuit of a sub-minature construction in the form of a flat constructional element, with the evaluation circuit being disposed beside the leaf spring on a side wall of the housing. With the construction of a sub-minature evaluation circuit, sufficient space remains in the housing for accommodating the same, with the width of the space being essentially predetermined by the pressure transducer thereby enabling the disposition of a complete evaluation circuit on a lateral wall of the housing whereby installation of a three point circuit is also possible without any significant difficulty. In this case, especially a transformation of an analog input signal of the pressure sensor into a digital output signal is also possible thereby resulting in the opening up of various additional possibilities for using the pressure sensor of the present invention.

The above and other objects, features and advantages of the present invention will become more apparent from the following description when taken in connection with the accompanying drawings which show, for the purposes of illustration only, three embodiments in accordance with the present invention.

Figure 1:
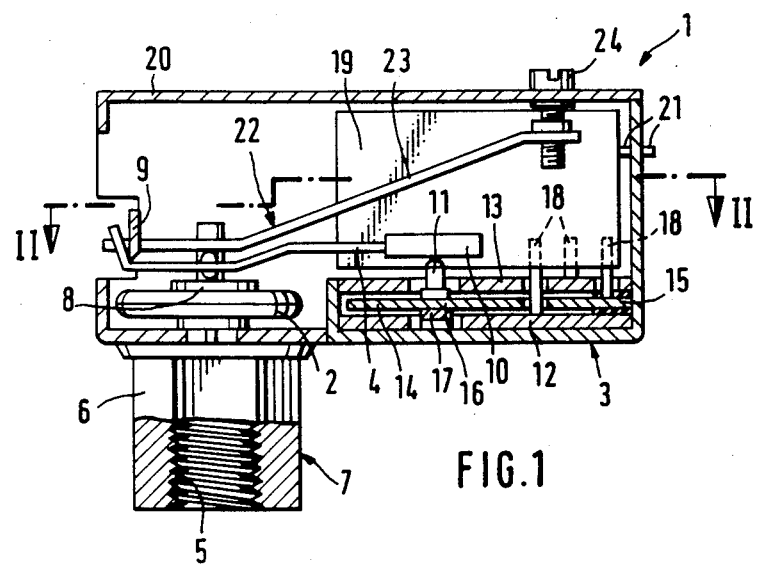
FIG. 1 is a cross-sectional view of a pressure sensor constructed in accordance with the present invention.
Figure 2:
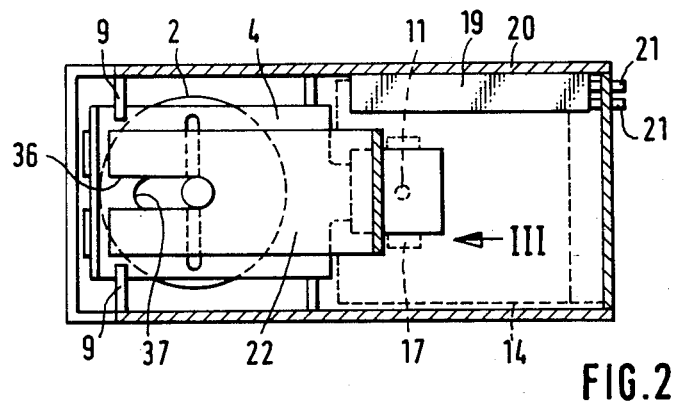
FIG. 2 is a cross-sectional view taken along the line II—II in FIG. 1.
Figure 3:
FIG. 3 is a detailed view of an additional spring of the pressure sensor of the present invention taken in the direction of the arrow III in FIG. 2.

Referring now to the drawings wherein like reference numerals are used throughout the various views to designate like parts and, more particularly, to FIGS. 1-3, according to these figures, a pressure sensing control arrangement generally designated by the reference numeral 1 includes a pressure path converter or transducer 2 and a mechanical-electrical converter or transducer generally designated by the reference numeral 3, with a transmission lever 4 being interposed therebetween. The transducer member 2 may be fashioned at a diaphragm or membrane member incorporated in the housing, or as a corrugated cylindrical or pipe-shaped bellows member, a Bourdon tube, or a cylinder-piston unit. The transducer 2 may be connected to a pressure line (not shown) by, for example, a connecting member generally designated by the reference numeral 7 which includes a threaded portion 5 and a correspondingly threaded hexagonally shaped coupling member 6. The deflection corresponding to the pressure to be absorbed is transferred by a movable deflection member 8 connected to the transmission lever 4. The transmission lever 4 has one end thereof pivotally mounted on an edge or knife shaped bearing support 9 fixedly mounted in the housing, with an opposite end of the transmission lever carrying a sliding or actuating member 10 which is adapted to positively strongly displace the tappet 11 of the transducer 3 in response to a displacement of the deflection member 8. With regard to the moment arm of the transmission lever 4, the distance of the tappet 11 by virtue of the single arm construction of the transmission lever 4, a distance of the tappet 11 to the edge bearing 9 amounts to about five times a distance between the deflection member 8 and the bearing 9 so that the pressure sensing control arrangement 1 is highly sensitive due to this favorable force transmission ratio. Since only a pressure fit but no joint connection exists between the actuating or sliding piece 10 and the tappet 11, no transverse forces are transmitted to the tappet 11.

A mechanical electric transducer 3 is fashioned as a plate condenser with two fixed condenser plates 12, 13 having disposed therebetween a movable condenser plate 14 formed as a bendable plate clamped at an edge 15. The movable condenser plate is separated from the fixed condenser plates 12, 13 by layers of insulating material. The movable condenser plate 14 includes a power introducing point or lead 16 disposed at a predetermined distance from the clamped edge 15, with the tappet being attached to the lead or point 16. A spring 17, the configuration of which is shown most clearly in FIG. 3, is disposed below the movable condenser plate 14. The individual condenser plates 12, 13, 14 are electrically connected by way of contact pins 18 with an evaluation circuit 19 of a conventional construction. The evaluation circuit 19, of a sub-minature construction, is fashioned as a substantially flat constructional element and is adapted to be disposed at one lateral wall of a housing 20 of the pressure sensor arrangement 1. A starting signal for the evaluation circuit may be transferred to the outside by way of contact pins 21 or non-detachable cords or wires.

The transmission lever is held against the deflection piece 8 and the tappet 11 by a leaf spring generally designated by the reference numeral 22, with the leaf spring being clamped on the transmission lever 4 at an area near the edge support or bearing 9. The leaf spring loads the transmission lever 4 at a point directly opposite the deflection member 8 and subsequently passes over into an upwardly directed adjustable leg 23, with a free end of the adjustable leg 23 being connected to an adjusting arrangement 24. The adjusting arrangement 24 may, for example, include an adjusting screw seated in a lid of the housing 20. The leaf spring 22 extends almost an entire length of the housing 20 and occupies about half of a width of the housing 20. The strength of the leaf spring 22 together with the construction of the transducer 2 determines a possible pressure area for the pressure sensor arrangement 1 to, for example, a range of 0.8 to 50 bar. As a result of the adjusting arrangement 24, the counter pressure of the leaf spring 22 can be transferred to the deflection member 8 loaded by the pressure of the measuring medium in such a way that the pressure sensor arrangement 1 only operates over a small working range of, for example, 0.5 bar. This working range may be predetermined particularly precisely since the distance between the adjusting arrangement 24 and the support or bearing edge 9 is almost seven times as large as the distance from the support or bearing edge 9 to the deflection member 8.

Since the leaf spring 22 and the additional spring 17 act in opposite directions to one another, the movable condenser plate may be deflected upwards as well as downwards by the transmission lever depending upon the load so that depending on a nearness of the movable condenser plate 14 to the fixed lower condenser plate 12 or the fixed upper condenser plate 13, different switching signals may be produced so as to achieve a two-point and a three-point switch arrangement.

Figure 4:
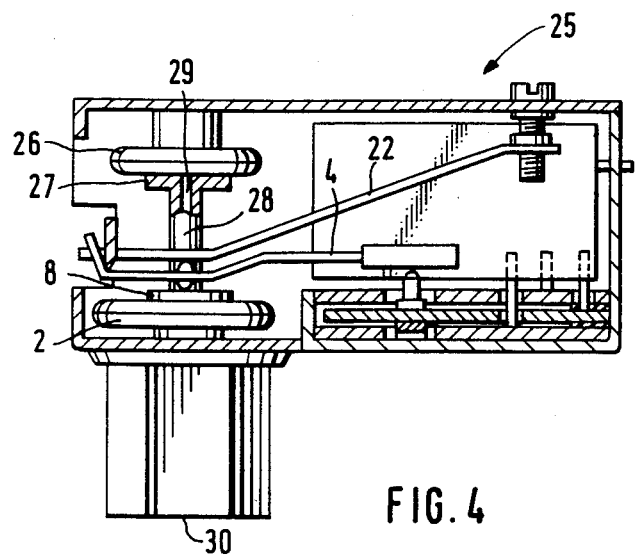
FIG. 4 is a cross-sectional view of another embodiment of a pressure sensor constructed in accordance with the present invention for monitoring higher pressure.

As shown in FIG. 4, a pressure sensor generally designated by the reference numeral 25, for use in sensing higher pressures, includes two pressure converters or transducers 2, 26, with respective deflection members 8, 27 thereof being coupled by a coupling rod or bar 28. A channel 29 for connecting the pressure chambers of the two transducers 2, 26 with one another is provided in the coupling rod or bar 28 so that both transducers 2, 26 are connected to a joint pressure inlet 30. The pressure sensor 25 is generally constructed analogously to the pressure sensor of FIGS. 1 and 2; however, the transducers are of a variable size. By virtue of the arrangement of the two transducers 2, 26 only a force is transmitted to the leaf spring and the transmission lever 4 which corresponds to the size-difference of the pressure loaded surfaces of the respective transducers which are different in size.

Figure 5:
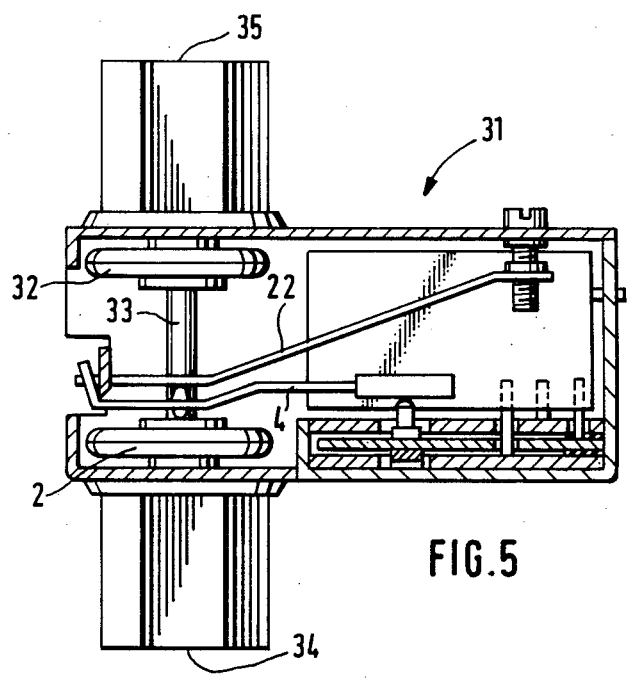
FIG. 5 is a cross-sectional view of still another embodiment of a pressure sensor constructed in accordance with the present invention for monitoring differential pressures.

In FIG. 5, a differential pressure sensor generally designated by the reference numeral 31 includes two transducers 2, 32 which are coupled by way of a coupling bar or rod 33. Unlike the pressure sensor 25 of FIG. 4, the transducers 2, 32 are of the same size. In FIG. 5, the transducers 2, 32 are not connected to one another by a channel but are supplied by way of variable pressure inlets 34, 35 so that only the differential pressure between the two pressure inlets 34, 35 will act on the leaf springs 22 and the transmitting lever 4.

In all embodiments a fork-like slit 36 and an elongated hole 37 are respectively provided in the leaf spring 22 and the transmission lever 4 in order to enable an accommodation of the coupling bars 28 or 33 in the embodiment of FIGS. 4 and 5 or of a centering pin in the embodiment of FIGS. 1 to 3.

By virtue of the features of the present invention as described hereinabove, it is possible to provide a pressure sensor which may be manufactured at a reasonable cost with low input and output voltage, and which nevertheless provides for a highly precise response.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. Pressure sensor means for monitoring a pressure of an aggressive media, the pressure sensor means comprising:
   at least one pressure transducer means including a movable deflection member;

mechanical-electric transducer means including a plate condenser means having a movable condenser plate clamped at one edge thereof, a power introducing point provided on the movable condenser plate at a position spaced from the clamped edge, said plate condenser means is disposed laterally adjacent the pressure transducer means with the movable condenser plate being disposed substantially perpendicular to a direction of movement of the deflection member;

transmission lever means interposed between said pressure transducer means and said mechanical electric transducer means, said transmission lever means being mounted at only one end thereof;

leaf spring means for enabling an adjustment of a precise response of the pressure sensor means in a pressure range of between 0.8 to 50 bar, said leaf spring means is disposed on a side of the transmission lever means facing away from the pressure transducer means, said leaf spring means being adapted to hold the transmission lever means against the deflection member and on the power introduction point of the movable condenser plate means whereby the leaf spring means is clamped at one end thereof at a support of the transmission lever means so as to load the transmission lever means in an area directly opposite the deflection member, the leaf spring means includes a free adjustable leg portion extending over the plate condenser means.

2. A pressure sensor means according to claim 1, wherein the condenser means further includes two fixed condenser plate means between which the movable condenser plate means is disposed, and wherein an additional spring means is provided for urging the movable plate condenser means is a direction opposite a direction of force of the leaf spring means.

3. A pressure sensor means according to claim 2, further comprising a rectangular elongated housing means, the leaf spring means has a length substantially equal to a full length of the housing means and a width equal to about one half of a width of said housing means.

4. A pressure sensor means according to claim 3, wherein the leaf spring means extends from the clamped end to the deflection member approximately in parallel to the transmission lever means and subsequently passes over into the adjustable leg portion, the adjustable leg portion which is disposed at an upward slant, and wherein an adjusting means is provided for connecting the free end of the leaf spring means to a lid of the housing means.

5. A pressure sensor means according to claim 2, wherein at least two pressure transducer means of equal size are provided, each of said pressure transducer means includes a separate pressure inlet and a deflection member, with the pressure transducer means being disposed with the deflection members thereof facing each other, means for coupling the deflection members to each other, and means in the leaf spring means and the transmission lever means for accommodating the coupling means.

6. A pressure sensor means according to claim 5, further comprising an electric evaluation circuit means of a substantially subminature construction formed as a substantially flat constructional element, said evaluation circuit means being disposed laterally adjacent the leaf spring means.

7. A pressure sensor means according to claim 2, wherein at least two variable size pressure transducer means are provided which communicate with a joint pressure inlet, each of said pressure transducer means includes a deflection member, said pressure transducer means are disposed such that the deflection members face each other, means are provided for coupling the deflection members to each other, and means are provided in the coupling means for enabling a communication between pressure spaces of the two pressure transducer means.

8. A pressure sensor means according to claim 7, further comprising an electric evaluation circuit means of a substantially subminature construction formed as a substantially flat constructional element, said evaluation circuit means being disposed laterally adjacent the leaf spring means.

9. A pressure sensor means according to claim 1, wherein the movable condenser plate means includes a tappet means disposed at the power introduction point, said transmission lever means includes a slidable actuating member disposed on the tappet means.

10. A pressure sensor means according to claim 1, wherein said at least one pressure transducer means includes at least one of a diaphragm, a diaphragm box, a corrugated pipe bellows means, a Bourdon tube, or a cylinder-piston arrangement.

11. A pressure sensor means according to claim 1, further comprising a rectangular elongated housing means, the leaf spring means has a length substantially equal to a full length of the housing means and a width equal to about one half of a width of said housing means.

12. A pressure sensor means according to claim 1, wherein at least two pressure transducer means of equal size are provided, each of said pressure transducer means includes a separate pressure inlet and a deflection member, with the pressure transducer means being disposed with the deflection members thereof facing each other, means for coupling the deflection members to each other, and means in the leaf spring means and the transmission lever means for accommodating the coupling means.

13. A pressure sensor means according to claim 12, further comprising an electric evaluation circuit means of a substantially subminature construction formed as a substantially flat constructional element, said evaluation circuit means being disposed laterally adjacent the leaf spring means.

14. A pressure sensor means according to claim 1, further comprising an electric evaluation circuit means of a substantially subminature construction formed as a substantially flat constructional element, said evaluation circuit means being disposed laterally adjacent the leaf spring means.

* * * * *